United States Patent [19]

Ishida et al.

[11] Patent Number: 4,695,122

[45] Date of Patent: Sep. 22, 1987

[54] OPTICAL THIN FILM WAVEGUIDE

[75] Inventors: Koji Ishida, Musashino; Hiroyoshi Matumura, Iruma, both of Japan

[73] Assignee: Hitachi, Ltd., Tokyo, Japan

[21] Appl. No.: 696,478

[22] Filed: Jan. 30, 1985

[30] Foreign Application Priority Data

Feb. 1, 1984 [JP] Japan ................................. 59-15179

[51] Int. Cl.⁴ .................................................. G02B 6/12
[52] U.S. Cl. ................................ 350/96.12; 350/96.34
[58] Field of Search ............... 350/96.11, 96.12, 96.13, 350/96.29, 96.30, 96.31, 96.34

[56] References Cited

U.S. PATENT DOCUMENTS

| | | | |
|---|---|---|---|
| 3,962,062 | 6/1976 | Ingrey | 350/96.12 X |
| 3,999,835 | 12/1976 | Newns et al. | 350/96.34 X |
| 4,319,803 | 3/1982 | Burmeister et al. | 350/96.34 X |
| 4,464,762 | 8/1984 | Furuya | 350/96.11 X |

FOREIGN PATENT DOCUMENTS 57-14810 1/1982 Japan ................................. 350/96.12

OTHER PUBLICATIONS

Deitch et al, "Sputtered Thin Films for Integrated Optics", *Applied Optics*, vol. 13, No. 4, Apr. 1974, pp. 712–715.

Ingrey et al, "Variable Refractive Index and Birefringent Waveguides by Sputtering . . .", *Applied Optics*, vol. 14, No. 9, Sep. 1975, pp. 2194–2198.

*Primary Examiner*—John Lee
*Attorney, Agent, or Firm*—Antonelli, Terry & Wands

[57] ABSTRACT

An optical waveguide obtained by forming on a substrate an amorphous silicon film which contains a predetermined quantity of at least one of the elements of hydrogen, nitrogen and oxygen so that the amorphous silicon film has a predetermined value of refractive index. The optical waveguide can be made easily by carrying out a sputtering operation, in which Si is used as a target with a mixed gas of argon and at least one of hydrogen, nitrogen and oxygen, or a mixed gas of hydrogen and at least one of nitrogen and oxygen used as a sputtering gas, the composition of the sputtering gas being controlled in a predetermined manner during the sputtering operation.

14 Claims, 5 Drawing Figures

OPTICAL THIN FILM WAVEGUIDE

BACKGROUND OF THE INVENTION:

This invention relates to an optical waveguide which is needed in an optical integrated circuit used in the technical fields of optical communication and optical processing, and a method of manufacturing the same.

An optical waveguide consists of a core portion provided on a substrate material and adapted to guide light, and a clad portion, the refractive index of which is lower than that of the core portion. No matter how the optical waveguide is constructed, not less than two kinds of transparent materials having different refractive indexes are required, and, moreover, these materials must consist of films. The difference between the refractive indexes of these materials is not more than 2-3% at the highest in most cases. A number of kinds of materials including semiconductors, ferroelectrics, glass and organic materials have been reported as the materials which can be used to manufacture an optical waveguide. A combination of such materials having a suitable refractive index difference has been used selectively in accordance with the purpose of the optical waveguide. However, if the construction of an optical waveguide, the differences between the refractive indexes of parts thereof and the manufacturing method are considered carefully, the number of combinations of film materials which can be used in practice is extremely limited. In other words, the designing of an optical waveguide is reetricted largely by the materials, so that it becomes difficult to design an optical waveguide freely.

This difficulty becomes more remarkable especially in the case where a substrate material in use has a high refractive index because there are a variety of materials which have a comparatively low refractive index, and which include various kinds of glass, whereas there are a very few materials which have a high refractive index.

In order that an optical integrated circuit can perform various operations, such as optical modulation and optical switching, it is necessary to utilize physical phenomena, such as the electro-optic effect and the magneto-optic effect. In order to meet these requirements, it is necessary to use special substrate materials, such as electro-optic crystals and magneto-optic crystals. In general, these crystals have a high refractive index as compared with other materials. For example, gallium arsenide which has attracted widespread attention as a material for an optical integrated circuit has a refractive index of as high as about 3.43 when the wavelength is 1 μm. There are no materials except a ternary material of gallium aluminum arsenide, which have such a high refractive index, and which can be combined with gallium arsenide. However, in order to deposit this ternary material on a substrate of gallium arsenide, there is no choice but to employ a complicated method utilizing the epitaxial growth of a film. It is very difficult to form an optical waveguide of an arbitrary construction by using this method.

Due to the above-mentioned facts, there are few examples of optical switches and optical modulators which have heretofore been made public and which have the configuration of a buried waveguide. A buried waveguide is a most excellent waveguide. It shows a small loss, and is not damaged by extended use, among some types of threedimensional waveguides.

The following references are cited to show the state of the art; (i) J. E. Goell; Applied Optics, Vol. 12 (1973), page 737, (ii) T. Izawa et al; Applied Physics Letter, Vol. 38 (1981), page 483, (iii) D. H. Hensler; Applied Optics, Vol. 10 (1971), page 1037.

SUMMARY OF THE INVENTION

An object of the present invention is to provide an optical waveguide which is free from the above-mentioned problems encountered in a prior art optical waveguide and which has a greatly increased degree of freedom of design, more particularly an optical waveguide having such construction that is difficult to achieve with conventional materials and conventional manufacturing methods, and still more particularly an optical waveguide having the construction requiring materials with a high refractive index, and to provide a method for manufacturing such an optical waveguide easily.

In order to achieve the above object, the present invention provides an optical waveguide in which at least a part of the core and/or at least a part of the clad consists of a transparent optical material, which is produced by the same sputtering method except that the composition of the sputtering gas is varied, and the same sputtering apparatus, and which enables a refractive index to be controlled to a desired level in a wide range, and to such a desired level as necessary that includes a level exceeding 3. This optical waveguide is formed by carrying out a sputtering operation using Si as a target and a mixed gas as a sputtering gas (i) consisting of argon and at least one gas selected from the group composed of hydrogen, nitrogen and oxygen, or (i) consisting of hydrogen and at least one gas selected from the group composed of nitrogen and oxygen while controlling the sputtering conditions, especially, the composition of the mixed gas, to thereby form an amorphous silicon film having a refractive index of an arbitrary value in a wide range on the substrate, whereby a thin film type optical waveguide is obtained.

This amorphous silicon film is a thin film of silicon, and in an amorphous state, which contains at least one other element (the content of which is in the range of levels lower than the level at which the whole of the silicon in use turns into silicon nitride and / or silicon oxide) selected from the group consisting of hydrogen, nitrogen and oxygen. The content of the other elements may be set to a level which is high enough to obtain a desired value of refractive index, and not specially limited. The state of the other elements contained in the amorphous silicon is not ascertained exactly. No matter what the state of these elements is, the silicon film in an amorphous state containing at least one of the above-mentioned elements shall be shown in the specification of the invention as an "amorphous silicon film". When the whole of the silicon turns into silicon nitride ($Si_3N_4$) and silicon oxide ($SiO_2$), the refractive index has a comparatively small value of not more than about 2.3 in all cases. Therefore, a film of such an amorphous silicon film may not be included in the present invention. Accordingly, the content of each of the other element may be in a range lower than the level at which the whole of the silicon in use turns into silicon compounds.

When the wavelength is 1.0 μm, an amorphous silicon film containing no other elements has a refractive index of 3.78, an amorphous silicon film having a sufficiently high hydrogen content a refractive index of 3.18, an amorphous silicon film having a sufficiently high nitrogen content, i.e. a silicon nitrite film a refractive index of about 2.3, and an amorphous silicon film having a sufficiently high oxygen content, i.e. a silicon dioxide film having a refractive index of about 1.46. Consequently, an amorphous silicon film used for the optical waveguide according to the present invention has a refractive index of an arbitrary value between 1.46-3.78 when the wavelength is 1.0 μm, and especially has a refractive index of such a comparatively high arbitrary value as between 2.3-3.78. In order to increase the refractive index of a material to be deposited on a substrate, it is recommendable to increase the argon content in the sputtering atmosphere. In order to reduce the refractive index of a material to be deposited on a substrate, it is recommendable to increase the content of hydrogen, nitrogen or oxygen in accordance with a desired value of the index.

In order to form an amorphous silicon film during the manufacturing of an optical waveguide according to the present invention, a sputtering operation may be done by using a sputtering gas consisting of the above-mentioned mixed gas which has a composition such that enables the resultant amorphous silicon film to have a refractive index of a desired value, and as the remaining sputtering conditions the known sputtering conditions for the formation of known silicon films may be employed. The substrate used to form an optical waveguide according to the present invention may consist of the same material as the substrate used for the formation of a conventional optical waveguide.

The substrate used in the present invention will now be further described with reference to FIG. 1 (what is shown in this figure will be described more in detail later in "Embodiment 1").

The substrate on which an amorphous silicon film is formed may consist of any of the following: (i) a substrate composed of an intrinsic substrate 10 alone, which has no clad layers and no optical waveguide layers, (ii) one having a lower clad layer 11 already formed on the surface of the intrinsic substrate 10, (iii) one having both the lower clad layer 11 and an optical waveguide layer 12 which are already formed on the surface of the intrinsic substrate 10. In the specification of the present invention, all of the above (i), (ii), (iii) shall be called "substrates". In case of (i), a lower clad layer 11, an optical waveguide layer 12 and an upper clad layer 13, all of which consist of the above-mentioned amorphous silicon film, are formed on the surface of the substrate 10. In case of (ii), an optical waveguide layer 12 and an upper clad layer 13, both of which consist of the above-mentioned amorphous silicon film, are formed on the surface of the lower clad layer 11 which is already formed on the clad-carrying substrate 10. In case of (iii), an upper clad layer 13 consisting of the above-mentioned amorphous silicon film is formed on the optical waveguide layer 12 already formed with the lower clad layer 11 on the lower clad- and optical waveguide-carrying substrate 10.

The present invention is based on the experimentally-proved fact that, as mentioned above, the refractive index of an amorphous silicon film formed by a sputtering method can be controlled by varying the sputtering conditions. Since a film having an arbitrary refractive index can be formed by carrying out a sputtering operation under suitably selected conditions, optical waveguides having various types of construction can be manufactured simply.

DESCRIPTION OF THE PREFERRED EMBODIMENTS

Embodiment 1

Figure 1:
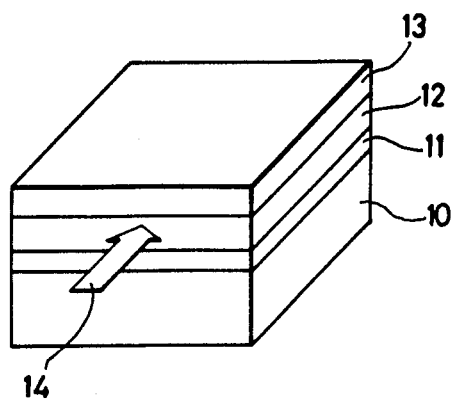
FIG. 1 is a schematic perspective of an optical waveguide in an embodiment of the present invention.
Figure 2:
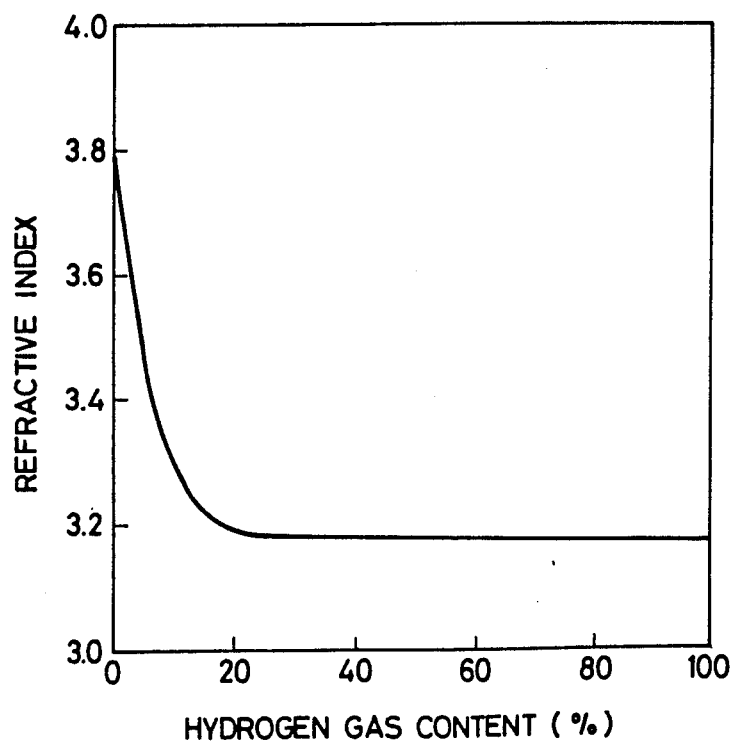
FIG. 2 is a graph showing the relation between the composition of a sputtering gas in use, which consists of a mixed gas of argon and hydrogen, and the refractive index of the resultant amorphous silicon film.

First, a polycrystalline silicon and a mixture of argon and hydrogen were used as a target and a sputtering gas, respectively, to form films of amorphous silicon on glass substrates with the mixing ratio of the argon gas and hydrogen gas varied. The thicknesses and spectral transmitting characteristics of these films were determined. The refractive indexes of the films with respect to various wavelengths were then determined in the same manner as known well. FIG. 2 shows variations in the refractive index of the amorphous silicon films with respect to the concentration (vol %) of the hydrogen gas, which was determined with respect to the wavelength of 1.0 μm. The sputtering was done under the following conditions.

| | |
|---|---|
| RF power | 325 W |
| Sputtering pressure | 0.33 Pa |
| Substrate temperature | 250° C. |
| Total flow rate of sputtering gas | 32 ml/min |

As may be understood from FIG. 2, the refractive index of the amorphous silicon film can be selected freely and continuously in the range of 3.18 to 3.78 by varying the mixing ratio of hydrogen gas to argon gas used in a sputtering operation from 100:0 to 0:100 continuously.

The three amorphous silicon films 11, 12, 13, the refractive indexes of which were controlled in accordance with the relation determined on the basis of what is shown in FIG. 2, were then formed continuously as mentioned above on the quartz substrate 10. The results of measurement of the refractive indexes and thicknesses of the amorphous silicon films 11, 12, 13 formed by a sputtering operation were as follows. The concentration of hydrogen in the sputtering gas was set lowest during the formation of the film 12.

| Film formed by sputtering | Refractive index | Thickness (μm) |
|---|---|---|
| 11 | 3.36 | 0.8 |
| 12 | 3.56 | 1.2 |
| 13 | 3.44 | 1.0 |

A He-Ne laser beam having a wavelength of 1.15 μm was applied by using an object lens to the optical waveguide layer, which had been made in the above-mentioned manner, in the direction of an arrow 14 in the drawing, and a transmission loss of the guided light passed through the optical waveguide 12 was measured. The transmission loss was as low as about 2.1 dB/cm. The results shown above indicate that an amorphous silicon film formed by the sputtering method is suitable as a material for an optical waveguide.

The amorphous silicon films 11, 12, 13 are the lower clad layer, the optical waveguide layer and the upper clad layer, respectively, and the film 12 has the lowest hydrogen content.

Embodiment 2

Figure 4:
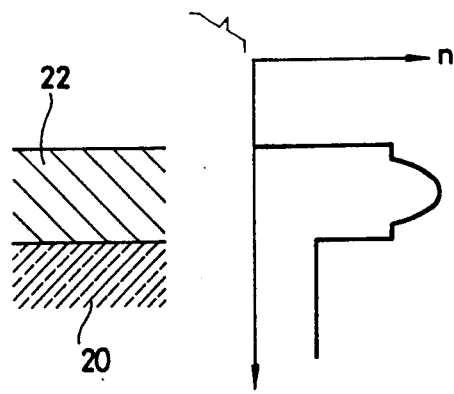
FIG. 4 is a schematic section of an optical waveguide in other embodiments of the present invention, and the distribution of the refractive index thereof.

A sputtering operation, employing Si as a target as mentioned above, was carried out in the same manner as in Embodiment 1 except that the amorphous silicon film was deposited on a substrate 20 of GaAs single crystal and the concentration of hydrogen with respect to argon varied in the range of 2–5% (vol %, hereinafter the gas composition will be represented by vol %) with the lapse of time so that the concentration of hydrogen decreased gradually in an initial stage and thereafter increases again, to form a graded type optical waveguide of amorphous silicon having a vertically symmetrical distribution of refractive index in the direction of thickness of the film as shown in the right-hand portion of FIG. 4. A cross section of this optical waveguide is shown in the left-hand portion of FIG. 4. The total thickness of the optical waveguide layer 22 was 4 $\mu$m, and the minimum and maximum refractive indexes 3.47 and 3.63, respectively, the thickness of each of the upper and lower portions which have a constant refractive index being 1 $\mu$m. The transmission loss of this optical waveguide with respect to the He-Ne laser beam of the wavelength of 1.15 $\mu$m was 2.3 dB/cm. The hydrogen content in the amorphous silicon film was lowest in the portion thereof which had the highest refractive index, and increased gradually in the portions thereof which were above and below the mentioned portion. The graded type optical waveguide having a refractive index distribution which is symmetric in the direction of the thickness of the film is very difficult to manufacture with the conventional diffusion method and ion implantation method. According to the present invention, such an optical waveguide can be manufactured by a simple means for varying the composition of a sputtering gas with the lapse of time during a sputtering operation. A graded optical waveguide is taken as an example in the above description; an optical waveguide having any distribution of refractive index in the direction of the thickness of the film can be made simply according to the present invention by merely varying the composition of a gas with the lapse of time during a sputtering operation.

Embodiment 3

Figure 3:
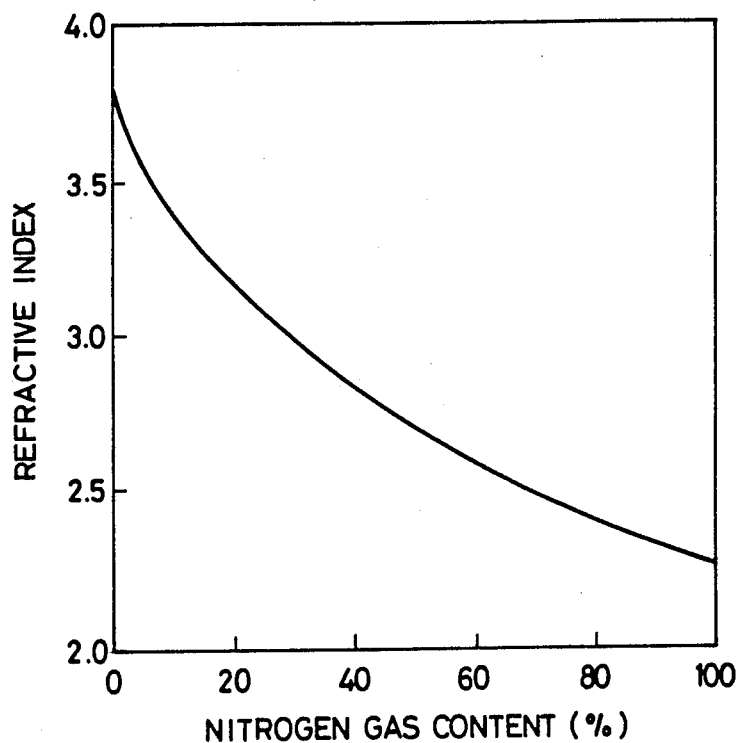
FIG. 3 is a graph showing the relation between the composition of a sputtering gas in use, which consists of a mixed gas of argon and nitrogen, and the refractive index of the resultant amorphous silicon film.

Amorphous silicon films were formed on glass substrates in the same manner as in the case in which FIG. 2 was made in Embodiment 1, except that the hydrogen was replaced by nitrogen with the RF power set to 300 W, by varying the mixing ratio of argon gas to nitrogen gas, then the refractive indexes thereof were measured. Variations in the refractive indexes determined when the wavelength was 1.0 $\mu$m of the resultant amorphous silicon films with respect to the concentration (vol %) of the nitrogen gas were as shown in the graph in FIG. 3. As shown in FIG. 3, when the mixing ratio of the argon gas and nitrogen gas is varied, an amorphous silicon film having an arbitrary refractive index of 2.3–3.78 can be made.

Amorphous silicon films were then formed on quartz glass substrates 20 by using Si as a target and a mixed gas of argon gas and nitrogen gas as a sputtering gas, and controlling the refractive indexes on the basis of the relation determined with reference to what is shown in FIG. 3. During this sputtering operation, the concentration of the nitrogen gas with respect to that of argon gas was varied in the range of 10–20% with the lapse of time. Thus, graded type optical waveguides having a vertically symmetric refractive index distribution shown in the right-hand portion of FIG. 4 were made in the same manner as in Embodiment 2 except that the quartz glass substrates and nitrogen gas instead of hydrogen gas were used. FIG. 4 shows at its left-hand portion a cross section of an optical waveguide thus obtained. The total thickness of the film of the optical waveguide 22 was 4 $\mu$m, and the minimum and maximum refractive indexes 2.85 and 3.50, respectively, the thickness of the upper and lower portions which have a constant refractive index being 1 $\mu$m. The value of transmission loss of this optical waveguide with respect to the He-Ne laser beam having a wavelength of 1.15 $\mu$m was 4.2 dB/cm, which was slightly larger than that in Embodiment 1. It has been ascertained that, when the mixing ratio of nitrogen gas to argon gas is varied in such a manner as in Embodiment 3, an amorphous silicon film the refractive index of which can be controlled to a desired level in a wide range can also be obtained. The range of refractive index in this embodiment is 2.3–3.78, which is wider than that in Embodiment 1 in which a mixed gas of argon and hydrogen is used.

In the above embodiments, a mixed gas consisting of argon to which hydrogen or nitrogen is added is used. Even when a mixed gas consisting of argon to which hydrogen and nitrogen are added was used, an amorphous silicon film, the refractive index of which can be controlled to a desired level in a wide range, could be obtained in the same manner as in the above embodiments. When the oxygen was added to the mixed gas having the above-mentioned composition, an amorphous silicon film, the refractive index of which can be controlled to a desired level in a wider range, could be obtained.

Embodiment 4

Figure 5:
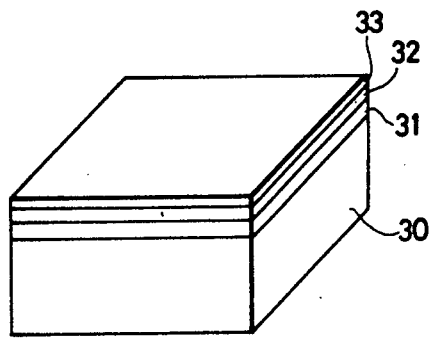
FIG. 5 is a schematic perspective of an optical waveguide in a further embodiment of the present invention.

In this embodiment, GaAlAs thin film crystals were formed on a GaAs substrate by the liquid phase growth, and a GaAs layer was then formed on the film. An amorphous silicon film was then formed on this optical waveguide layer to obtain a single mode optical waveguide easily, which had a clad consisting of an insulating film serving also as a surface-protecting film, and which had a large film thickness. The optical waveguide in this embodiment will now be described with reference to FIG. 5.

A Ga$_{0.8}$Al$_{0.2}$As layer 31 was formed to a thickness of 3 $\mu$m by the liquid phase growth on a GaAs substrate 30 of 400 $\mu$m in thickness, the surface of which consists of (100) plane. A GaAs layer 32 was then grown to a thickness of 4.1 $\mu$m on the resultant product to obtain an optical waveguide layer. The He-Ne laser beam of a wavelength of 1.15 $\mu$m was then applied to this optical waveguide in such a state that no amorphous silicon film 33, which will be described later, was formed thereon, to observe the near field pattern and ascertain that the mode number was 3. The refractive indexes, which were calculated on the basis of the above-mentioned composition, of the GaAs optical waveguide layer and the $Ga_{0.8}Al_{0.2}As$ clad layer formed under the waveguide layer were 3.43 and 3.35, respectively. An amorphous silicon film 33 of 1.8 μm in thickness, the refractive index of which was regulated to 3.41 on the basis of the relation determined with reference to the information given in FIG. 2, was formed on this optical waveguide layer by the above-mentioned sputtering method, and the near field pattern was observed in the same method as referred to above to ascertain that the optical waveguide had a single mode.

Let $n_s$, $n_f$, $n_c$ be the refractive indexes of a substrate, an optical waveguide layer and a clad layer formed on the waveguide layer respectively, and let h and λ be the thickness of the optical waveguide layer and a wavelength respectively. The conditions for a single mode of a waveguide layer are expressed generally by the following formula (in which $n_f > n_s$, $n_f > n_c$).

$$\frac{1}{2\pi} \frac{1}{\sqrt{n_f^2 - n_s^2}} \tan^{-1}\{|n_s^2 - n_c^2|/(n_f^2 - n_s^2)\}^{\frac{1}{2}}$$

$$< \frac{h}{\lambda} < \frac{1}{2\pi} \cdot \frac{1}{\sqrt{n_f^2 - n_s^2}} [\tan^{-1}\{|n_s^2 - n_c^2|/(n_f^2 - n_s^2)\} + \pi]$$

In this embodiment, $n_s = 3.35$, $n_f = 3.43$, and, when the upper clad layer consists of air, $n_c = 1$. Accordingly, in order that the optical waveguide is operated in a single mode by using the He-Ne laser with λ set to 1.15 μm, the thickness of the optical waveguide layer must be not more than 2.6 μm. In order to couple the optical waveguide layer with an other optical device, for example, a light source or an optical fiber, efficiently, it is preferable that the optical waveguide has a larger thickness. In order to meet the requirements, as derived immediately from the above formula, the refractive index of the upper clad layer may be set to the level which is close to that of the refractive index of the optical waveguide layer. Since the GaAs crystals have a high refractive index, no suitable clad materials except GaAlAs crystals were found. According to the present invention, an amorphous silicon film having an arbitrary refractive index which is close to that of the GaAs crystals can be made simply by a sputtering method, so that an optical waveguide having an optical waveguide layer of such a thickness that enables the layer to be coupled with another optical device easily can be made with ease.

As mentioned above, according to the present invention, an amorphous silicon film, the refractive index of which can be set to an arbitrarily selected level in a wide range, can be obtained. When this amorphous silicon film is used for optical waveguides, optical waveguides having an arbitrary refractive index and the arbitrary refractive index distribution can be obtained by a manufacturing method simplified to a great extent. The present invention enables the degree of freedom of design for an optical waveguide to increase greatly.

Obviously many modifications and variations of the present invention are possible in the light of the above teachings. It is therefore to be understood that, within the scope of the appended claims, the invention may be practiced otherwise than as specifically described.

What is claimed is:

1. A thin film type optical waveguide formed on a substrate, characterized in that at least a part of a core or a clad thereof consists of a sputtered amorphous silicon film which contains such a quantity of at least one other element selected from the group consisting of hydrogen, nitrogen and oxygen that is in the range of quantities not large enough to cause the whole of the silicon to turn into a silicon compound.

2. An optical waveguide according to claim 1, wherein said amorphous silicon film contains at least one other element selected from the group consisting of hydrogen and nitrogen.

3. An optical waveguide according to claim 1, wherein said amorphous silicon film has a refractive index in the range of 1.46–3.78.

4. An optical waveguide according to claim 1, wherein said substrate has thereon a first amorphous silicon film, a second amorphous silicon film on said first amorphous silicon film, which second amorphous silicon film has a content of said other element lower than that in said first amorphous silicon film, and a third amorphous silicon film on said second amorphous silicon film, which third amorphous silicon film has a content of said other element higher than that in said second amorphous silicon film.

5. An optical waveguide according to claim 1, wherein said amorphous silicon film on said substrate is formed so that the content of said other element therein decreases gradually from an interface between said substrate and said amorphous silicon film toward the inner side of said film wherein said content reaches the lowest level, said content thereafter increasing gradually toward the outer surface of said film.

6. An optical waveguide according to claim 1, wherein said substrate has on its surface an optical waveguide layer, said amorphous silicon film, the refractive index of which is lower than that of said waveguide layer, being provided thereon.

7. An optical waveguide according to claim 1, wherein said substrate has on its surface a lower clad layer, a first amorphous silicon film, the refractive index of which is higher than that of said lower clad layer, being provided thereon, a second amorphous silicon film, the content of said other element of which is higher than that is said first amorphous silicon film, being provided on said first amorphous silicon film.

8. A thin film type optical waveguide formed on a substrate, characterized in that at least a part of a core or a clad thereof consists of a sputtered amorphous silicon film which contains such a quantity of at least one other element selected from the group consisting of hydrogen, nitrogen and oxygen that is in the range of quantities not large enough to cause the whole of the silicon to turn into a silicon compound, wherein said amorphous silicon has a refractive index between 2.3 and 3.78.

9. An optical waveguide according to claim 8, wherein said amorphous silicon film has a refractive index between 3.18 and 3.78.

10. An optical waveguide according to claim 8, wherein said amorphous silicon film contains at least one other element selected from the group consisting of hydrogen and nitrogen.

11. An optical waveguide according to claim 8, wherein said substrate has thereon a first amorphous silicon film, a second amorphous silicon film on said first amorphous silicon film, which second amorphous silicon film has a content of said other element lower than that in said first amorphous silicon film, and a third amorphous silicon film on said second amorphous silicon film, which third amorphous silicon film has a content of said other element higher than that in said second amorphous silicon film.

12. An optical waveguide according to claim 8, wherein said amorphous silicon film on said substrate is formed so that the content of said other element therein decreases gradually from an interface between said substrate and said amorphous silicon film toward the inner side of said film wherein said content reaches the lowest level, said content thereafter increasing gradually toward the outer surface of said film.

13. An optical waveguide according to claim 8, wherein said substrate has on its surface an optical waveguide layer, said amorphous silicon film, the refractive index of which is lower than that of said waveguide layer, being provided thereon.

14. An optical waveguide according to claim 8, wherein said substrate has on its surface a lower clad layer, a first amorphous silicon film, the refractive index of which is higher than that of said lower clad layer, being provided thereon, a second amorphous silicon film, the content of said other element of which is higher than that in said first amorphous silicon film, being provided on said first amorphous silicon film.

* * * * *